(12) United States Patent
Gomez et al.

(10) Patent No.: US 7,701,515 B2
(45) Date of Patent: Apr. 20, 2010

(54) MULTI-INPUT MULTI-OUTPUT TUNER FRONT ENDS

(75) Inventors: Ramon A. Gomez, San Juan Capistrano, CA (US); Charles Brooks, Laguna Beach, CA (US); Leonard Dauphinee, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1691 days.

(21) Appl. No.: 10/882,293

(22) Filed: Jul. 2, 2004

(65) Prior Publication Data

US 2005/0195335 A1 Sep. 8, 2005

Related U.S. Application Data

(60) Provisional application No. 60/543,912, filed on Feb. 13, 2004.

(51) Int. Cl.
*H04N 5/44* (2006.01)
(52) U.S. Cl. ...................................... 348/731
(58) Field of Classification Search ................. 348/725, 348/731, 706, 729, 726; 455/139, 276.1, 455/277.1, 277.2, 134, 135
See application file for complete search history.

(56) References Cited

U.S. PATENT DOCUMENTS 5,313,660 A * 5/1994 Lindenmeier et al. ....... 455/135
5,844,632 A * 12/1998 Kishigami et al. .......... 348/706
6,188,447 B1 * 2/2001 Rudolph et al. ............. 348/729
6,577,353 B1 * 6/2003 Welles et al. ................ 348/706
7,034,898 B1 * 4/2006 Zahm et al. ................. 348/725
7,203,470 B2 * 4/2007 Seo ............................. 455/139
7,221,911 B2 * 5/2007 Knobel et al. ................ 455/42
7,379,751 B2 * 5/2008 Wada et al. ............... 455/552.1
2004/0127185 A1 * 7/2004 Abrahams et al. ........ 455/277.1
2006/0031894 A1 * 2/2006 Petruzzelli ................... 725/100

\* cited by examiner

*Primary Examiner*—Paulos M Natnael
(74) *Attorney, Agent, or Firm*—Sterne, Kessler, Goldstein & Fox P.L.L.C.

(57) ABSTRACT

A front end circuit for a television receiver includes a demultiplexer for inputting a multi-band signal from a signal source and separating the multi-band signal into corresponding bands. A plurality of amplifiers adjust gain on signals corresponding to the bands. A multiplexer combines outputs of the amplifiers into a gain-adjusted signal. A plurality of switches direct selected bands to corresponding tuners. The amplifiers are low noise amplifiers. The amplifiers adjust gain between the bands so as to have similar signal strength in the bands. A cable TV input may also be used, wherein the switches also direct signals from the cable TV to the corresponding tuners. Each amplifier can output two (or more) identical signals for its corresponding band, the multiplexer can be a dual multiplexer, and an output of the multiplexer includes only bands selected for direction to the tuners. The signal source comprises any of a broadcast channel received from an antenna, a cable TV channel received from a cable line, and a combination of the two.

21 Claims, 6 Drawing Sheets

MULTI-INPUT MULTI-OUTPUT TUNER FRONT ENDS

CROSS-REFERENCE TO RELATED APPLICATIONS

This application is a non-provisional of U.S. Provisional Patent Application No. 60/543,912, filed on Feb. 13, 2004, entitled MULTI-INPUT MULTI-OUTPUT TUNER FRONT ENDS, which is incorporated herein by reference.

BACKGROUND OF THE INVENTION

1. Field of the Invention

The present invention relates to television tuners, and more particularly, to tuners used for reception of multiple channels.

2. Related Art

As televisions begin to incorporate the ability to receive digital, as well as analog broadcast signals, television tuners must offer improved performance and additional features at an attractive cost. An important specification for a tuner intended for digital terrestrial applications is immunity to strong interfering signals. These may be either unwanted television signals or signals from other sources. Another important specification is sensitivity, which is the lowest signal level that can be received with acceptable fidelity. An important feature that is often desired is the capability to receive two or more channels at once, for picture-in-picture (PIP) or personal video recording (PVR) capability.

There are various arrangements used in existing television systems to receive multiple channels at once. Either a passive splitter or an active splitter is used to provide inputs to two or more tuners. Passive splitters produce little distortion and give good immunity to unwanted interference, but they reduce the signal level driving each tuner and therefore reduce sensitivity. Active splitters (without pre-selection or automatic gain control) result in a low system noise figure and good sensitivity, but have significant distortion at high signal levels, and degrade immunity to strong interfering signals.

Furthermore, it may be required for the television to receive any combination of off-air and cable signals, up to the limit of the number of tuners. If one tuner is dedicated to off-air signals and another to cable signals, for example, this will not be possible.

Accordingly, there is a need in the art for a front end circuit configuration that provides pre-selection for off-air channels, AGC (automatic gain control), and switching capability for simultaneous reception of any combination of input signals, up to the number of tuners in the system.

SUMMARY OF THE INVENTION

The present invention is directed to multi-input multi-output tuner front ends that substantially obviate one or more of the problems and disadvantages of the related art.

An embodiment of the present invention includes a front end circuit for a television receiver that includes a demultiplexer for inputting a multi-band signal from a signal source and separating the multi-band signal into corresponding bands. A plurality of amplifiers adjust gain on signals corresponding to the bands. A multiplexer combines outputs of the amplifiers into a gain-adjusted signal. A plurality of switches direct selected bands to corresponding tuners. The amplifiers are low noise amplifiers. The amplifiers adjust gain between the bands so as to have similar signal strength in the bands. A cable TV input may also be used, wherein the switches also direct signals from the cable TV to the corresponding tuners. Each amplifier can output two identical signals for its corresponding band, the demultiplexer can be a dual demultiplexer, and an output of the demultiplexer includes only bands selected for direction to the tuners. The signal source comprises any of a broadcast channel received from an antenna, a cable TV channel received from a cable line, and a combination of the two. A diplexer may be used for receiving an upstream signal from the cable TV subscriber equipment and directing it to the cable TV headend. Downstream and upstream signal flows are in opposite directions. The diplexer shields the splitter and the tuners from high power of the upstream signal.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to illustrate exemplary embodiments of the invention and are incorporated in and constitute a part of this specification, illustrate embodiments of the invention and together with the description serve to explain the principles of the invention. In the drawings.

DETAILED DESCRIPTION OF EMBODIMENTS OF THE INVENTION

Reference will now be made in detail to the embodiments of the present invention, examples of which are illustrated in the accompanying drawings.

In one embodiment of this invention (see FIG. 1 discussed below), there are two input connectors, one from an antenna for receiving off-air signals, and one for cable television signals from a CATV system. The off-air signals are demultiplexed by an appropriate demultiplexing filter network. This pre-selects the off-air signals, limiting the input to the tuners to only the frequency bands allotted for off-air reception. Each demultiplexer output drives a low-noise amplifier (LNA) with automatic gain control. By having independent gain control for each band, the tuner input will see a reduced range of signal power levels, resulting in improved sensitivity and improved immunity to interference. The LNA outputs are multiplexed with an appropriate filter network. This circuit can be designed to prevent noise summation in each band from the out-of-band LNAs. These in turn drive an active or passive splitter. The CATV signals drive an LNA with AGC (and possibly a pre-selection network). The outputs of the off-air and CATV splitter blocks drive a switch matrix, which allows two (or more) tuners to connect to any combination of input signals.

In another embodiment, the off-air LNAs have multiple outputs, which may be independently turned on and off. There are a number of multiplexers (equal to the number of outputs from one LNA). The corresponding outputs from each LNA drive one re-multiplexer, so that there are multiple outputs available to drive tuners. This arrangement has the advantage that signals in pre-selection bands not used by, e.g., tuner 1, can be turned off while not preventing tuner 2 from receiving signals in that band. This further reduces the amount of interference from unwanted channels, improving performance. This arrangement can work with the CATV splitter and switch matrix similar to FIG. 2 (discussed below) or in a standalone configuration (see FIG. 3 discussed below).

In another embodiment, the above configurations are modified to work with only one connector, which may be attached to either a CATV system or an antenna for off-air reception. In this case, an input switch is added to select whether the input drives amplifier/pre-selector/AGC/splitter blocks optimized for either CATV or off-air signals (see FIG. 4 discussed below).

Figure 5:
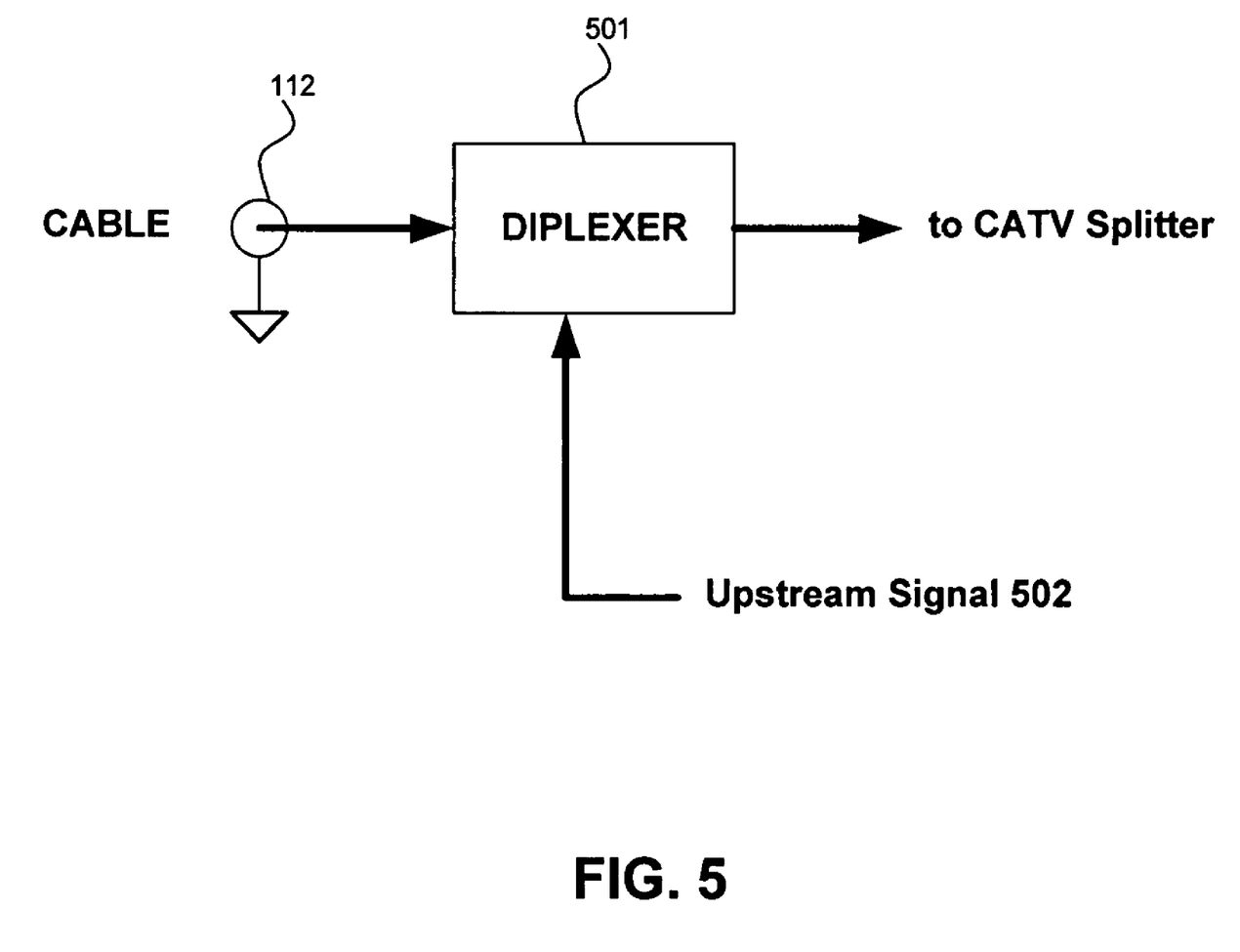
FIG. 5 shows how a cable TV diplexer can be used with the present invention.

In each of these embodiments, a diplexer may follow the CATV connector to allow the insertion of an upstream signal, for example, a return signal to the CATV system. This is illustrated in FIG. 5, discussed below.

Figure 6:
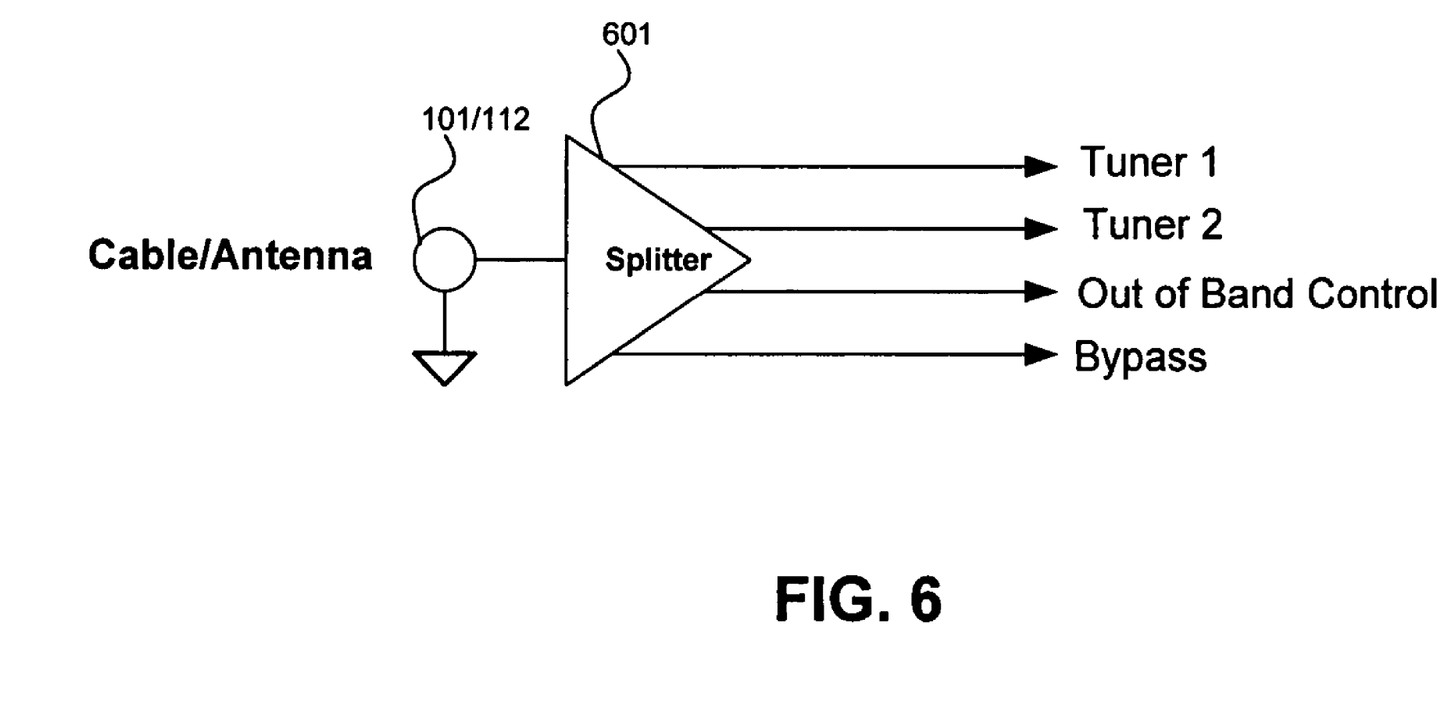
FIG. 6 illustrates how a splitter can be used with the present invention.

Also, in each of these embodiments, the CATV and/or off-air splitters may have additional outputs for out-of-band (OOB) control signals or a bypass function that relays the input RF signals to another device, such as a television or video recorder. This is illustrated in FIG. 6, discussed below.

The variable gain amplifiers in the above descriptions may have one or more stages, with independent or common AGC.

Figure 1:
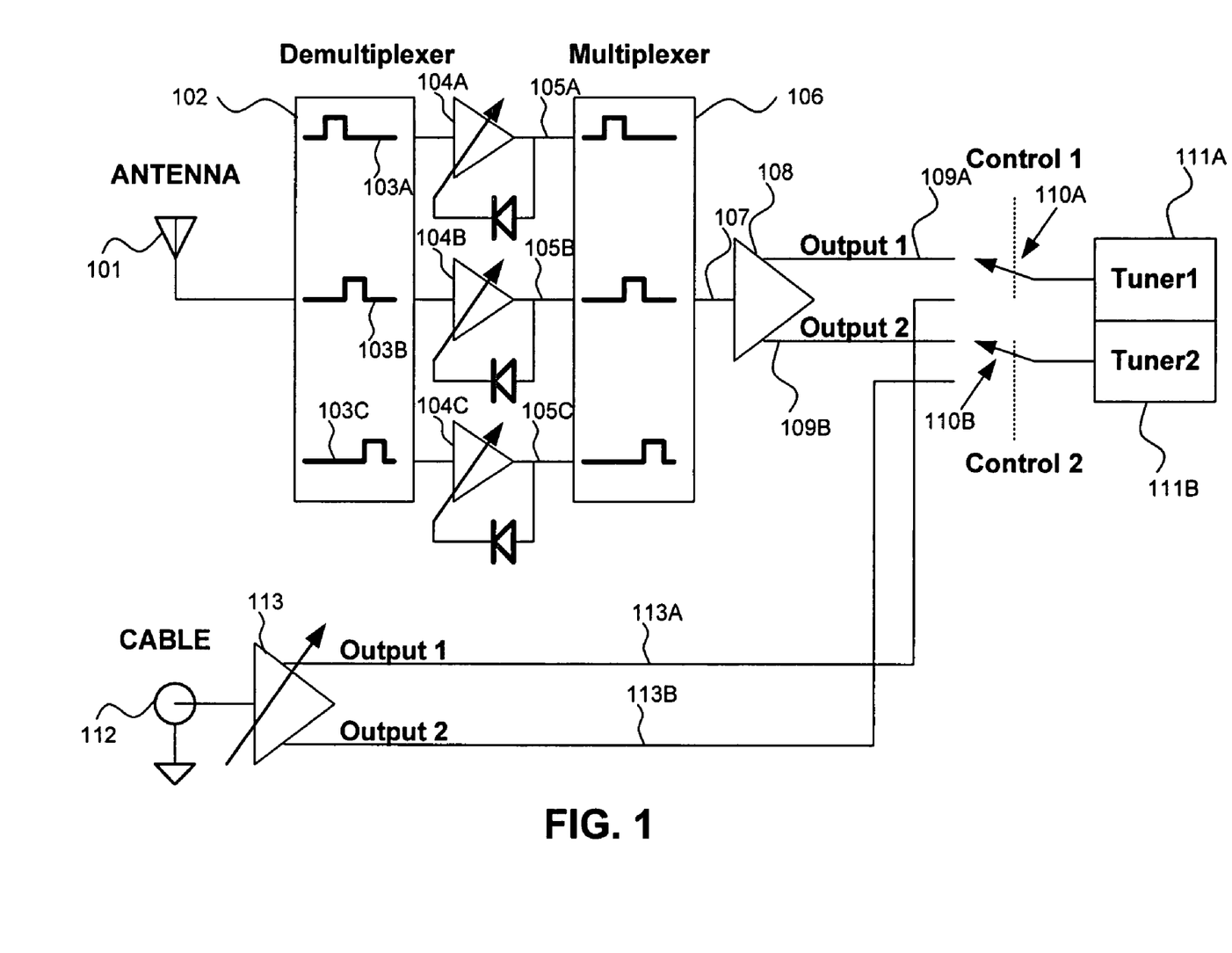
FIG. 1 illustrates a multi-tuner structure for a receiver with separate antenna and cable connectors according to one embodiment of the present invention.

FIG. 1 illustrates one embodiment of the present invention, showing a multi-tuner structure for a receiver with separate antenna and cable connectors. As shown in FIG. 1, an antenna 101 is connected to a demultiplexer 102. The demultiplexer 102 demultiplexes the incoming signal into (for example) three bands. Here, signal 103A corresponds to one band (which may be the lower VHF band, i.e., television channels 2-6), another signal 103B corresponds to the upper VHF band (television channels 7-13), and the signal 103C corresponds to the UHF band (television channels 14-69).

The signals 103A, 103B, 103C are fed into corresponding low noise amplifiers 104A, 104B, 104C, which also serve as automatic gain control amplifiers. The LNAs 104A-104C output respective signals 105A-105C, as shown in FIG. 1. These signals have comparable power in them, which enables reducing dynamic range requirements downstream of the signal. The signals 105A-105C are fed into a multiplexer 106, which outputs a single signal 107, representing the combination of the original bands (e.g., lower VHF, upper VHF, and UHF). The signal 107 is inputted into an active or passive splitter 108, which outputs two identical signals 109A, 109B.

A cable 112 is connected to an amplifier 113 (optionally an AGC amplifier), which splits the incoming signal into two identical signals 113A, 113B. Switches 110A, 110B are used to switch between any of the signals 109A, 109B, 113A, 113B, so as to input the corresponding signal into the tuner 111A, and/or 111B, based on control signals control 1, control 2. (Note that although only two tuners are shown, more tuners may also be used, depending on the application). The tuner can be a double conversion tuner, a single conversion tuner, or any other type of tuner as would be apparent to one skilled in the art. The outputs of Tuner1 (tuner 111A) and Tuner2 (tuner 111B) can then be used to provide two display outputs (e.g., picture-in-picture).

Figure 2:
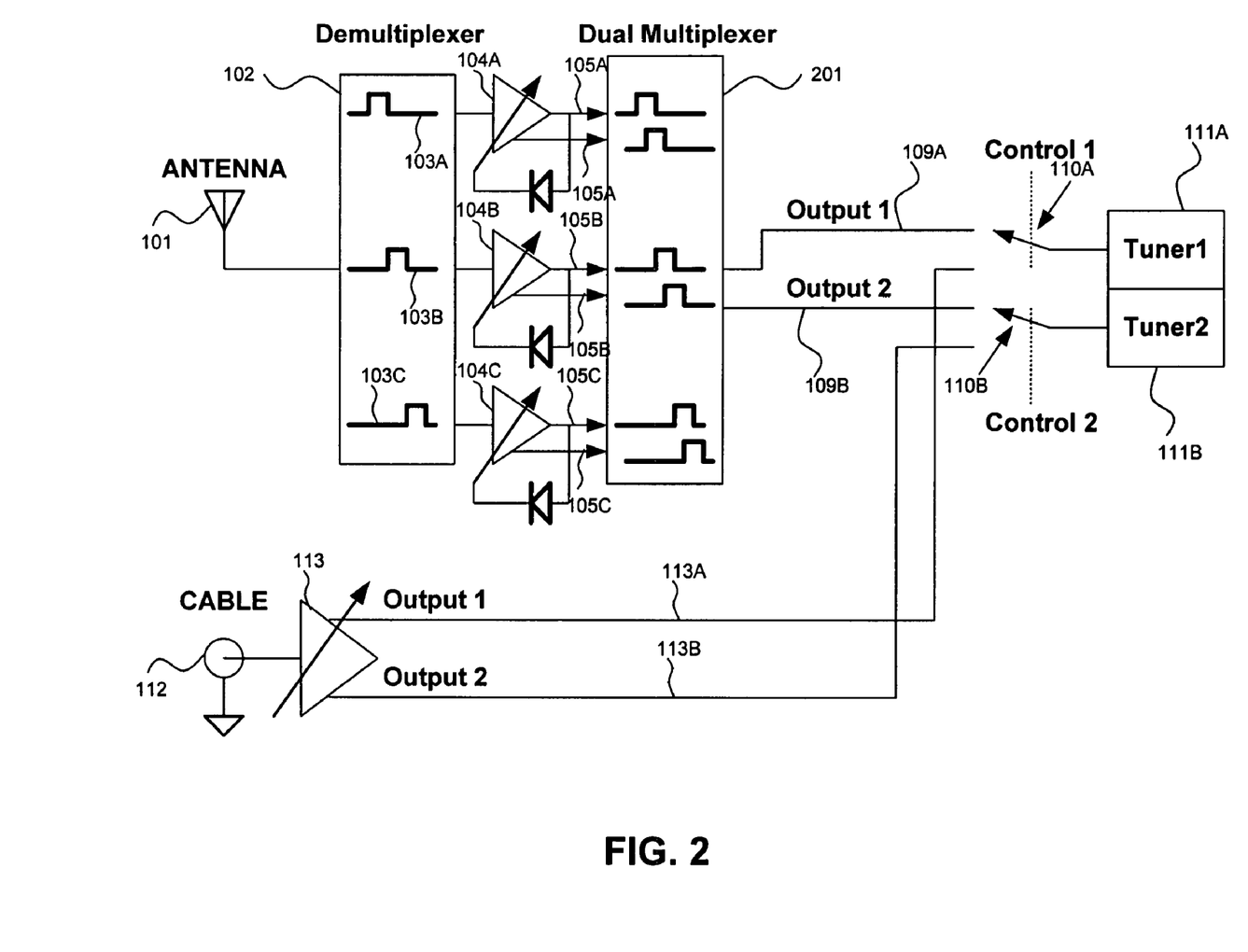
FIG. 2 illustrates another embodiment of the present invention with a multi-tuner structure having separate antenna and cable connectors.

FIG. 2 illustrates another embodiment of the present invention, showing another multi-tuner structure for a receiver with separate antenna and cable connectors. The primary difference between the embodiment of FIG. 2 and the embodiment of FIG. 1 is in that the low noise amplifiers 104A-104C are used to output two identical signals 105A, two identical signals 105B, and two identical signals 105C. Instead of a single multiplexer 106, a dual multiplexer 201 is used. With the structure shown in FIG. 2, any of the bands that the user does not select for watching (in other words, if the user selects to watch channel 2 on the main screen, and channel 8 on the picture in picture screen, with no UHF channel being watched at all) can be suppressed. This is particularly advantageous where there is a substantial difference in signal strength between the bands, which often happens in the case of UHF and VHF signals. UHF signals can at times be as much as 40 dB lower in signal strength compared to VHF signals. By suppressing the relevant band completely, the dynamic range requirements on the tuners 111A, 111B are substantially relaxed.

Figure 3:
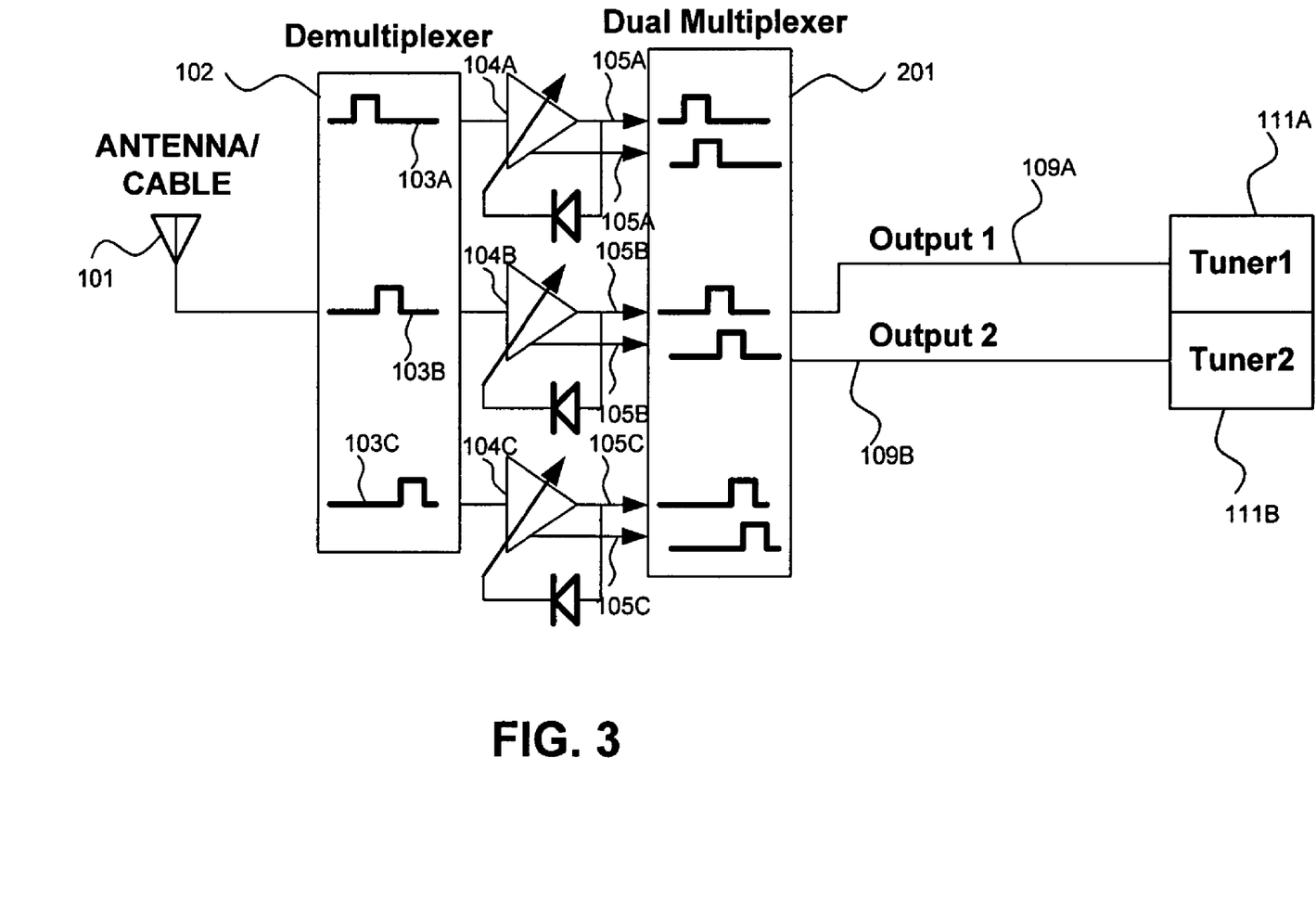
FIG. 3 shows a multi-tuner structure for a receiver with a single input according to another embodiment of the present invention.

FIG. 3 shows an illustration of the multi-tuner structure for a receiver with a single input. In the case of FIG. 3, there is no cable input, and the structure of FIG. 2 can be used to select two channels out of the three bands described above, all which are received from the antenna 101 (or, alternatively, all of which are received from the cable input 112).

Figure 4:
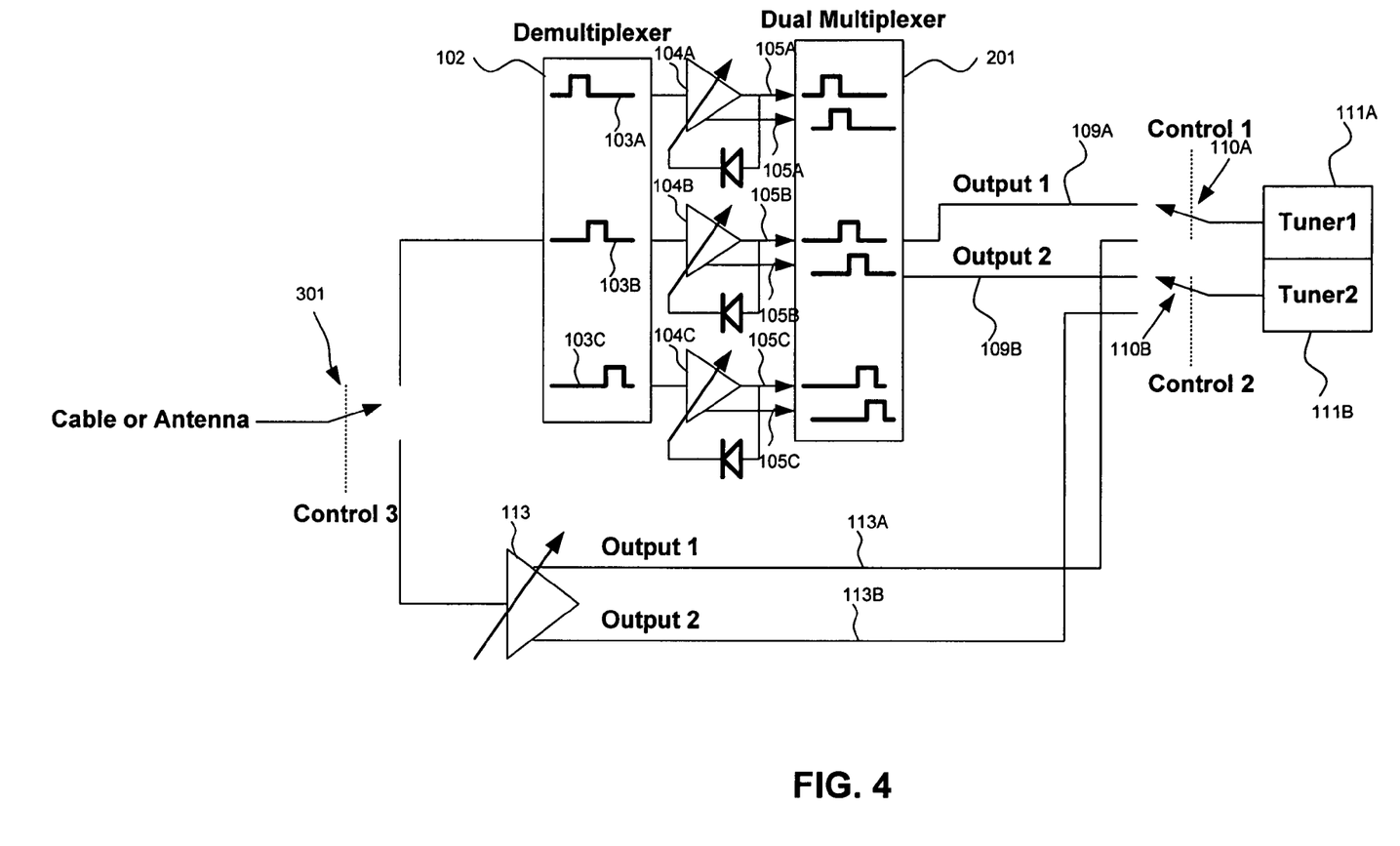
FIG. 4 shows another embodiment of the present invention, where the input to the front end comes from a single cable input or antenna input.

FIG. 4 shows another embodiment of the present invention, where the input to the front end comes from a single cable or antenna, and is switched between the amplifier 113 and the demultiplexer-LNA-dual multiplexer structure using a switch 301.

FIG. 5 illustrates a diplexer 501, which may be used in the present invention. For example, in the case of two-way cable communication (e.g., where a cable modem is used, in addition to television channel reception), an upstream signal 502 can be received by the diplexer 501, and then forwarded to the cable TV headend. FIG. 6 illustrates how out of band (OOB) signals may be used in the present invention. A cable 112, or an antenna 101 sends a signal to a splitter 601, which outputs signals to the tuners, an out of band control signal, and a bypass signal.

It will be appreciated that although the circuits illustrated in the figures are shown as using three bands, more or fewer bands may be used, depending on the application.

The circuits described above implement receiver front ends that provide pre-selection and automatic gain control optimized independently for the unique characteristics of two transmission media (terrestrial broadcast and CATV) to multiple tuners, and additionally allow any combination of input channels to be connected to the available tuners.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A front end circuit for a television receiver comprising:
   a demultiplexer for receiving a multi-band signal from a signal source and separating the multi-band signal into corresponding bands;
   a plurality of amplifiers for adjusting gain on signals corresponding to the bands;
   a multiplexer combining outputs of the amplifiers into a gain-adjusted signal;
   means for providing the gain-adjusted signal as two or more identical gain-adjusted signals; and
   a plurality of switches directing any combination of signals from 1) the identical gain-adjusted signals and 2) a cable TV input to corresponding tuners.

2. The circuit of claim 1, wherein the amplifiers are low noise amplifiers.

3. The circuit of claim 1, wherein the amplifiers adjust gain between the bands so as to have similar signal strength in the bands.

4. The circuit of claim 1, wherein each amplifier outputs two identical signals for its corresponding band,
   wherein the multiplexer is a dual multiplexer, and
   wherein an output of the multiplexer comprises only bands selected for direction to the tuners.

5. The circuit of claim 1, wherein the signal source comprises any of a broadcast channel received from an antenna, a cable TV channel received from a cable line, and a combination of the two.

6. The circuit of claim 5, further comprising a diplexer receiving an upstream signal from a cable TV subscriber equipment and directing it to a cable TV headend.

7. A front end circuit for a television receiver comprising:
   a demultiplexer separating a multi-band signal into corresponding bands;
   a plurality of amplifiers adjusting gain on signals corresponding to the bands;
   a multiplexer forming a gain-adjusted signal from outputs of the amplifiers;
   means for providing the gain-adjusted signal as two or more identical gain-adjusted signals; and
   a plurality of switches directing any combination of signals from 1) the identical gain-adjusted signals and 2) a cable TV input to corresponding tuners.

8. The circuit of claim 7, wherein the amplifiers are low noise amplifiers.

9. The circuit of claim 7, wherein the amplifiers adjust gain between the bands so as to have similar signal strength in the bands.

10. The circuit of claim 7, wherein each amplifier outputs two identical signals for its corresponding band,
    wherein the multiplexer is a dual multiplexer, and
    wherein an output of the multiplexer comprises only bands selected for direction to the tuners.

11. The circuit of claim 7, wherein a signal source of the multi-band signal comprises any of a broadcast channel received from an antenna, a cable TV channel received from a cable line, and a combination of the two.

12. The circuit of claim 11, further comprising a diplexer receiving an upstream signal from a cable TV subscriber equipment and directing it to a cable TV headend.

13. A method of processing a signal comprising:
    receiving cable TV signals and a multi-band signal from a signal source;
    separating the multi-band signal into corresponding bands;
    adjusting, via amplifiers, gain on signals corresponding to the bands;
    combining outputs of the amplifiers into a gain-adjusted signal;
    providing the gain-adjusted signal as two or more identical gain-adjusted signals; and
    directing any combination of signals from 1) the identical gain-adjusted signals and 2) the cable TV signals to corresponding tuners.

14. The circuit of claim 13, wherein the adjusting step adjusts gain between the bands so as to have similar signal strength in the bands.

15. The circuit of claim 13, further comprising outputting two identical signals for each corresponding band.

16. The circuit of claim 13, wherein the signal source comprises any of a broadcast channel received from an antenna, a cable TV channel received from a cable line, and a combination of the two.

17. A front end circuit for a television receiver comprising:
    a demultiplexer configured to receive a multi-band signal from a signal source and separate the multi-band signal into corresponding bands;
    a plurality of amplifiers configured to adjust gain on signals corresponding to the bands, wherein each amplifier outputs two identical signals for its corresponding band;
    a dual multiplexer configured to combine outputs of the amplifiers into a gain-adjusted signal, wherein an output of the dual multiplexer includes only bands selected for direction to corresponding tuners and provides the selected bands as two or more identical gain-adjusted signals; and
    a plurality of switches configured to direct the identical gain-adjusted signals to the corresponding tuners.

18. A front end circuit for a television receiver comprising:
    a demultiplexer configured to receive a multi-band signal from a signal source and separate the multi-band signal into corresponding bands, wherein the signal source includes any of a broadcast channel received from an antenna, a cable TV channel received from a cable line, and a combination of the two;
    a plurality of amplifiers configured to adjust gain on signals corresponding to the bands;
    a multiplexer configured to combine outputs of the amplifiers into a gain-adjusted signal;
    means for providing the gain-adjusted signal as two or more identical gain-adjusted signals;
    a plurality of switches configured to direct the identical gain-adjusted signals to corresponding tuners; and
    a diplexer configured to receive an upstream signal from a cable TV subscriber equipment and direct it to a cable TV headend.

19. A front end circuit for a television receiver comprising:
    a demultiplexer configured to separate a multi-band signal into corresponding bands;
    a plurality of amplifiers configured to adjust gain on signals corresponding to the bands, wherein each amplifier outputs two identical signals for its corresponding band;
    a dual multiplexer configured to form a gain-adjusted signal from outputs of the amplifiers, wherein an output of the dual multiplexer includes only bands selected for direction to corresponding tuners and provides the selected bands as two or more identical gain-adjusted signals; and
    a plurality of switches configured to direct the identical gain-adjusted signals to the corresponding tuners.

20. A front end circuit for a television receiver comprising:
a demultiplexer configured to separate a multi-band signal into corresponding bands, wherein a signal source of the multi-band signal includes any of a broadcast channel received from an antenna, a cable TV channel received from a cable line, and a combination of the two;
a plurality of amplifiers configured to adjust gain on signals corresponding to the bands;
a multiplexer configured to form a gain-adjusted signal from outputs of the amplifiers;
means for providing the gain-adjusted signal as two or more identical gain-adjusted signals;
a plurality of switches configured to direct the identical gain-adjusted signals to corresponding tuners; and
a diplexer configured to receive an upstream signal from a cable TV subscriber equipment and direct it to a cable TV headend.

21. A method of processing a signal comprising:
receiving a multi-band signal from a signal source;
separating the multi-band signal into corresponding bands;
adjusting, via amplifiers, gain on signals corresponding to the bands;
outputting, from the amplifiers, two identical signals for each corresponding band;
combining outputs of the amplifiers into a gain-adjusted signal;
providing the gain-adjusted signal as two or more identical gain-adjusted signals; and
directing the identical gain-adjusted signals to corresponding tuners, wherein the identical gain-adjusted signals include only bands selected for direction to the tuners.

* * * * *